Feb. 19, 1935.  G. W. GAIL  1,991,776
SEALING STRIP
Filed June 14, 1933

INVENTOR
George W. Gail,
BY R. Clyde Cruit
ATTORNEY

Patented Feb. 19, 1935

1,991,776

UNITED STATES PATENT OFFICE 1,991,776

SEALING STRIP

George W. Gail, Ruxton, Md.

Application June 14, 1933, Serial No. 675,841

5 Claims. (Cl. 20—69)

This invention relates to certain improvements in sealing or weather strips and primarily to that type of sealing strip wherein a flexible rubber contact strip is secured or anchored in a base member in such a manner as to prevent said rubber strip from being pulled out of or separated from said base member.

This improved sealing strip has been devised for particular application to cooperating moving parts wherein the pressure on said strip is in a direction transversely of the strip causing back and forth flexing of the strip along the entire length of said strip, said action or operation relative to sealing strips of this general type now in use, having a tendency to normally pull the rubber contact member from its base member, or produce a breaking or cracking of the rubber contact member at its point of flexure. Applicant's sealing strip is also applicable to abutting members as well as sliding members and in fact capable of use in any construction or assembly where an airtight or sealing operation is desired.

More particularly the present invention has for its object to provide a sealing strip comprising a semi-cylindrical relatively thin rubber strip having its free side edges securely locked or anchored in a base member below the surface of said base member, whereby the said side edges of the rubber strip enter the base member with practically no curvature.

Another object of the invention is the provision of an effective sealing strip that can be economically produced in a simple and practical manner on a quantity production basis and one that can be readily applied or secured in operative position.

A further object is to so construct the base member that it can be made in one piece or more than one piece as convenient, and as an additional modification the entire sealing strip can be made of one piece of flexible material.

The preferred embodiment of the invention is illustrated in the accompanying drawing in which Figure 1 is a transverse sectional view of the improved sealing strip showing the manner of anchoring the side edges of the flexible strip within the base member;

Figure 1:
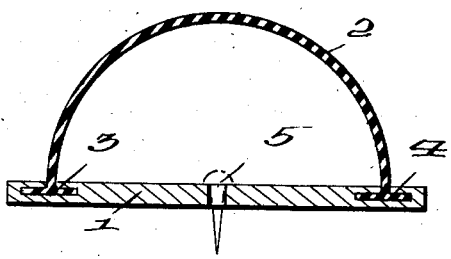

Referring to the drawing in detail the improved sealing strip comprises a base 1, preferably of wood, said base being provided with parallel T-shaped slots or grooves disposed along each side edge of the base member 1.

These T-shaped slots or grooves are adapted to receive the edges of the flexible or contact portion 2 of the sealing strip proper, these edges 3 and 4 of the flexible member 2 being formed with oppositely disposed flanges adapted to conform and fit within the T-shaped slots or grooves in the base member 1.

These T-shaped slots or grooves in the base member 1 are produced or made in any well known manner common to mill practice so that it is thought unnecessary to go into any detail description as to the production or the making of the base 1.

Figure 6:
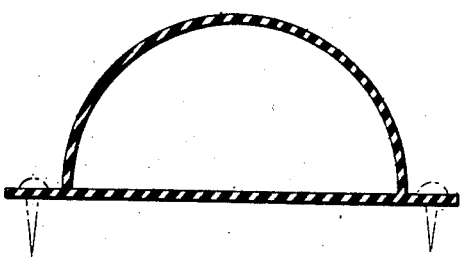
Figure 6 is a transverse sectional view of the further modification wherein the entire strip including the base is integrally formed of rubber.
Figure 2:
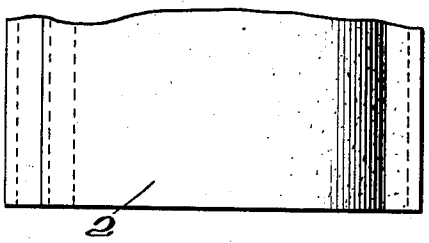
Figure 2 is a fragmentary plan view thereof.
Figure 3:
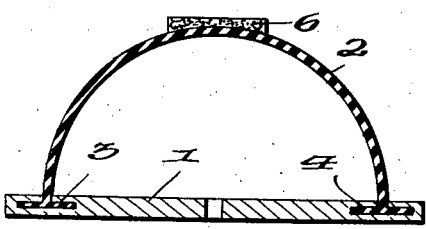
Figure 3 is a view similar to Figure 1 with the addition of a felt or the like contact strip secured to the flexible strip for the purpose to be hereinafter described.
Figure 4:
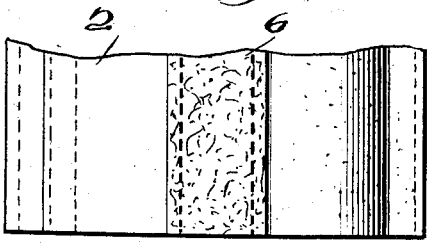
Figure 4 is a fragmentary plan view thereof.

The flexible portion 2 of the weather strip is preferably made of rubber and produced by the extrusion method and in its initial formation the said flexible portion 2 is of I formation after which it is bent in its semi-cylindrical form and the T-shaped flanges 3 and 4 are inserted in the parallel grooves of slots formed in the base member 1, said base member being first secured in position by fastenings or the like 5 or the strip may be completed and after which the sealing strip is secured in place as a whole in which event the same is secured in place by fastenings disposed along the outer edges of the base member 1 in the manner as shown in Figure 6.

Where the sealing strip is used in constructions necessitating a transverse frictional engagement of the flexible portion of the strip, in order to reduce the amount of friction, this flexible portion of the weather strip may be provided with a strip of felt or the like 6 as shown in Figures 3 and 4.

Figure 5:
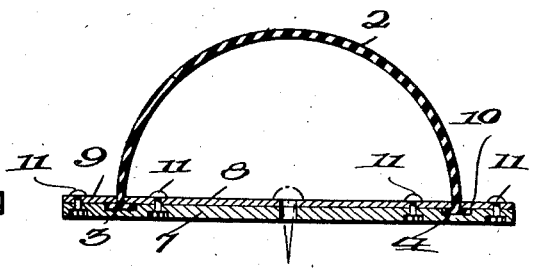
Figure 5 is a modification showing another means of securing the flexible strip to the base member.

In the constructions hereinbefore described the base member 1 is formed of a single piece but it is also within the scope of the invention to form this base member of two or more pieces as illustrated in Figure 5. Upon referring to Figure 5 it will be noted that said base member is formed with a main portion 7, an intermediate portion 8, and edge portions 9 and 10. In producing this form of weather strip the main base portion 7 is provided with parallel rectangular slots adapted to receive the T-shaped flanges 3 and 4 formed along the edges of the flexible portion 2 of the sealing strip. These T-shaped flanges 3 and 4 are inserted in the rectangular recesses and locked therein by the intermediate portion 8 and the edge portions 9 and 10 all of which will be perfectly clear upon referring to Figure 5 of the drawing. This base member comprising the parts 7, 8, 9 and 10 can be preformed and the flanges 3 and 4 of the flexible portion 2 inserted in place in a manner similar to the operation employed in connection with the construction as shown in Figures 1, 2, 3 and 4. It is understood, of course, that these parts 7, 8, 9 and 10 of the base member as shown in Figure 5 are securely held together by rivets, bolts or screws 11.

Figure 7:
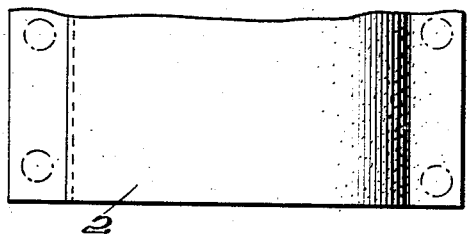
Figure 7 is a fragmentary plan view of Figure 6.

Figures 6 and 7 illustrate a further modification in which the flexible contact portion of the strip and base member are integrally formed of rubber. This construction of weather strip has certain advantages and uses but obviously is not of the same rigid construction as that illustrated in the remaining figures of the drawing.

Applicant is aware of prior constructions wherein flanges have been formed along the side edges of a semi-cylindrical flexible member and these flanges secured to a base member but in these prior constructions the flexing of the contact portion of the weather strip was at a point adjacent the right angle bending or flanging of the flexible member, which produced a weakened construction, whereas in applicant's construction the edges of the flexible member enter the base with practically no curvature and are anchored within the base and below the surface thereof so that a more serviceable construction is produced and the flexible portion of the weather strip is not flexed and weakened at its flanged portions.

Applicant is not to be limited to the specific details as shown and therefore obviously other means may be employed for accomplishing the same results within the scope of the appended claims.

Furthermore, although as hereinbefore described, applicant has referred to the flexible strip as being of rubber, other materials of similar flexible nature can be used in place of rubber.

Applicant has also described in the foregoing specification one method only of extruding the rubber or flexible strip in the form of an I, the strip thereafter to be bent in the form as shown in the drawing, but if preferred the flexible strip may be manufactured in its final or curved shape and furthermore said strip may be molded as distinguished from the extruding method.

What is claimed is:

1. In a sealing strip, the combination with a relatively thin flat base member, of a flexible strip, an anchoring flange on said flexible strip formed as an integral part thereof, said flange being disposed within the base strip parallel to, and below, the surface thereof, whereby the side edge of the flexible strip enters the base with practically no curvature.

2. In a sealing strip, the combination with a relatively thin flat base member, of a flexible strip, anchoring flanges on the opposite side edges of said flexible strip formed as an integral part thereof, said flanges being disposed within the base strip parallel to, and below, the surface thereof, whereby the side edges of the flexible strip enter the base with practically no curvature.

3. In a sealing strip, the combination with a base member provided with a T shaped longitudinal groove, of a flexible strip, and a T shaped anchoring flange on said flexible strip and formed as an integral part thereof adapted to be inserted and retained, in said groove.

4. In a sealing strip, the combination with a base member provided with parallel T shaped longitudinal grooves, of a semi-cylindrical flexible strip and T shaped anchoring flanges on the opposite side edges of said flexible strip and formed as an integral part thereof adapted to be inserted and retained, in said grooves.

5. In a sealing strip, the combination with a relatively thin flat base member provided with integrally formed parallel T shaped longitudinal grooves, of a semi-cylindrical flexible strip, and T shaped anchoring flanges on the opposite side edges of said flexible strip adapted to be inserted and retained, in said grooves.

GEORGE W. GAIL.